(12) United States Patent
Kirschner et al.

(10) Patent No.: US 9,857,204 B2
(45) Date of Patent: Jan. 2, 2018

(54) OPERATING A RESOLVER AND DETECTING A DEFECT IN THE RESOLVER

(71) Applicant: Robert Bosch GmbH, Stuttgart (DE)

(72) Inventors: Manfred Kirschner, Stuttgart (DE); Edwin Eberlein, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 5 days.

(21) Appl. No.: 14/736,358

(22) Filed: Jun. 11, 2015

(65) Prior Publication Data

US 2015/0362341 A1 Dec. 17, 2015

(30) Foreign Application Priority Data

Jun. 12, 2014 (DE) ........................ 10 2014 211 235

(51) Int. Cl.
*G01D 5/22* (2006.01)
*G01D 3/08* (2006.01)

(52) U.S. Cl.
CPC ............. *G01D 5/2291* (2013.01); *G01D 3/08* (2013.01)

(58) Field of Classification Search
CPC .................................................... G01D 5/2291
USPC ...................................................... 324/207.18
See application file for complete search history.

(56) References Cited

U.S. PATENT DOCUMENTS

| | | | |
|---|---|---|---|
| 4,740,778 A * | 4/1988 | Harding | |
| 4,864,284 A * | 9/1989 | Crayton | |
| 5,517,431 A * | 5/1996 | Pattantyus | |
| 6,577,957 B2 * | 6/2003 | Fujimoto | |
| 6,615,152 B2 * | 9/2003 | Fujimoto | |
| 6,958,620 B1 * | 10/2005 | Kozuki | |
| 2010/0207615 A1 * | 8/2010 | Dietmar | |

* cited by examiner

*Primary Examiner* — Walter L Lindsay, Jr.
*Assistant Examiner* — Milton Gonzalez
(74) *Attorney, Agent, or Firm* — Michael Best & Friedrich LLP

(57) ABSTRACT

An apparatus for operating a resolver which includes at least one first receiver winding and an exciter winding, which are/can be associated with a rotor, and an evaluation device which determines an angular position of the rotor as a function of an induced voltage that is generated by the exciter winding and detected by the receiver winding. According to the invention, the first receiver winding is connected at a first end to an actuable switch by means of a first RC circuit, said switch connecting the RC circuit as required to a positive voltage source, and the first receiver winding is connected at a second end to a second actuable switch by means of a second RC circuit, said second switch connecting the second RC circuit as required to a negative voltage source, and to a control unit which simultaneously actuates the switches as required.

9 Claims, 2 Drawing Sheets

OPERATING A RESOLVER AND DETECTING A DEFECT IN THE RESOLVER

BACKGROUND OF THE INVENTION

The invention relates to an apparatus for operating a resolver which includes at least one first receiver winding and at least one excitation winding, which are/can be associated with a rotor, and an evaluation device, which determines an angular position as a function of a voltage induced by means of the excitation winding through the rotor into the receiver winding.

In addition, the invention relates to a resolver device including a resolver and the apparatus described above as well as to a method for operating such a resolver device.

A so-called resolver is also frequently used in the automotive field in order to detect the angular position of a rotor of an electrical machine. The resolver constitutes an electromagnetic measuring transducer which outputs an electrical variable, for example voltage, as a function of the angular position. To this end, the resolver typically has a housing, in which two receiver windings that are offset by 90° to one another are disposed, said receiver windings enclosing a rotatably mounted rotor in the housing. At least one excitation winding is furthermore associated with the rotor and can, for example, be electrically contacted by means of a slip ring system. Resolvers are, however, also known which operate without brushes and therefore inductively transmit information to the excitation winding. The rotor is thereby expediently connected to an output shaft of the electrical machine or is directly formed by said shaft. Different electrical signals are generated as a function of the angular position of the rotor to the receiver windings by means of induction. To this end, the receiver windings are excited by a sinusoidal AC voltage, wherein the first receiver winding is excited by an AC voltage that is shifted by 90° with respect to the second receiver winding. The phasing of the voltages induced in the receiver windings thus depends on the position or, respectively, angular position of the rotor. Different resolver designs are generally known. Resolvers are also known, in which the excitation winding is disposed on the rotor such that it can rotate with said rotor and is, for example, contacted by means of the aforementioned slip ring system. If the rotor is located exactly at the angular position of 0° or 180°, a voltage of 0V results at the first receiver winding (referred to as sine winding). If the rotor is located exactly at the angular position of 90° or 270°, a voltage of 0V results at the second receiver winding (referred to as cosine winding). When the electrical machine is at rest at an angle of 0° or 180°, a short circuit bypassing the first stator winding can therefore not be detected. In the case of the sine track, a short circuit in the windings cannot be distinguished from an intact resolver at an angular position of 0°. Accordingly, a short circuit in the cosine track cannot be detected at an angular position of 90° and 270°. In other resolver designs, the exciter winding as well as the receiver windings is fixedly disposed relative to the housing or, respectively, on the stator side, wherein the exciter winding generates a magnetic field in the rotor by means of induction, which in turn induces a voltage in the receiver windings. In so doing, the coupling in the receiver windings is correspondingly dependent on the position of the rotor, wherein a maximum coupling into the cosine track occurs accordingly at an angular position of 0°.

SUMMARY OF THE INVENTION

The apparatus according to the invention for operating a resolver has the advantage that a short circuit and also other defects in the resolver can thus be reliably and unambiguously detected in a simple and cost effective manner if the rotor is located in the zero position thereof at 0° and that the diagnosis can be reliably carried out at all angular positions of the rotor, i.e. also at positions whereat the received signal is 0V. To this end, the apparatus is designed such that the first receiver winding is connected at a first end to an actuable switch by means of a first RC circuit, said switch connecting the RC circuit as required to a positive—in relation to a resting value—voltage source, and such that the first receiver winding is connected at a second end to a second actuable switch by means of a second RC circuit, said switch connecting the second RC circuit as required to a negative—in relation to the resting value—voltage source, wherein a control unit is furthermore provided which, as required, simultaneously actuates the switches and thereby monitors the oscillation behavior of the first receiver winding in order to detect a defect in the resolver. By actuating both switches, the receiver winding can thus be connected to a positive and negative voltage source, in each case by means of an RC circuit. The term RC circuit usually refers to an RC series circuit, i.e. a series circuit including a resistor and a capacitor. By actuating the switches, for example by simultaneously actuating the switches, an oscillating circuit is activated, in which the energy stored in the receiver winding is brought into oscillation, provided a defect is not present. By nature, a decaying oscillation behavior arises thereby between the two RC circuits. If a short circuit bypassing the receiver winding is present, the behavior of the detected coil voltage changes in such a way that the tendency to oscillation/oscillation behavior deviates greatly from the regular behavior, for example such that an oscillation no longer occurs. If, on the other hand, an electrical interruption is present, a constant DC voltage difference results which only disappears when the switches are deactivated. A defect in the resolver device can thus easily be concluded.

According to an advantageous modification to the invention, provision is made for the switches to be designed as transistors. The transistors can be precisely and quickly switched in order to utilize the oscillation behavior of the previously described oscillating circuit for detecting faults.

A voltage detection device is expediently assigned to each of the switches, said detection device detecting the voltage of the receiver winding being passed through the respective switch; thus enabling a first voltage profile and a second voltage profile of the receiver winding to be acquired when actuating the switches and said first and second voltage profile to be compared with one another. The oscillation behavior of the receiver winding is then acquired and evaluated as a function of the detected voltages.

Provision is expediently made for the negative voltage source to be a ground connection of the resolver or, for example, of a motor vehicle having the resolver. As a result, the oscillation behavior of the oscillating circuit can be advantageously evaluated.

Resolvers typically have at least two receiver windings. It is accordingly preferred for respectively two RC circuits including actuable switches to be associated with each of the receiver windings, said RC circuits being associated with a negative voltage source or, respectively, a positive voltage source in accordance with the description above. As a result, the resolver can be checked in its entirety in a simple manner.

The inventive resolver device including the apparatus according to the invention is associated with at least one of the stator windings. The previously mentioned advantages result therefrom. In addition, the apparatus or the resolver device expediently has a control unit, including a microcontroller, which evaluates the actuation of the switches and the monitoring of the voltage generated in the respective receiver winding.

In a particularly preferable manner, provision is made for an apparatus according to the invention to be associated with each of the stator windings of the resolver in order to detect defects on both receiver windings. In so doing, the apparatuses can have a common control unit.

In the inventive method, the switches associated with the respective winding are actuated a number of times for checking the sine track and the cosine track in a temporally offset manner and the resulting oscillation behavior of the at least one receiver winding is monitored, wherein a defect in the resolver is suggested as a function of the oscillation behavior. The oscillation behavior of each receiver winding of the resolver is preferably monitored.

In order to acquire the oscillation behavior, the voltages occurring at the switches associated with respectively one receiver winding are detected and evaluated. If oscillations are acquired during an actuation of the switches which significantly deviate from a regular behavior and especially run in the opposite direction of one another, a faultless resolver is thus suggested.

Provision is furthermore preferably made for a short circuit to be detected if, when actuating the switches, the voltages acquired at both switches correspond to one another.

In addition, provision is preferably made for an interruption to be detected if different and substantially oscillation-free voltages are acquired at the switches.

BRIEF DESCRIPTION OF THE DRAWINGS

The invention is explained below in detail with the aid of the drawings. In the drawings.

DETAILED DESCRIPTION

Figure 1:
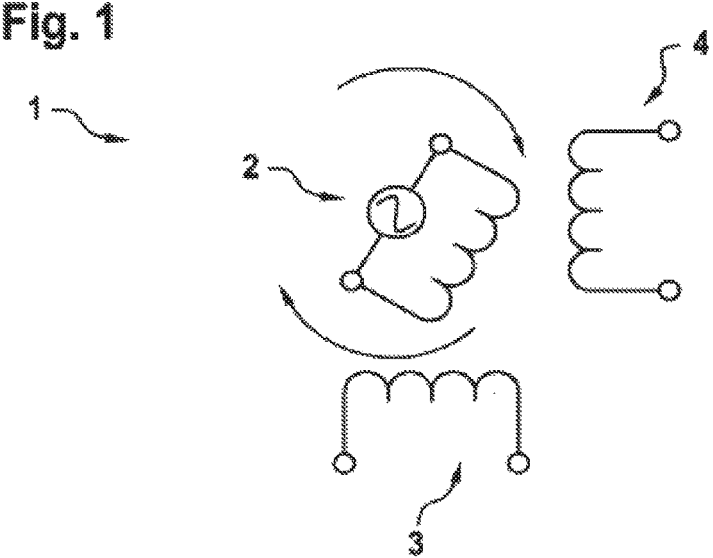
FIG. 1 shows a resolver in a simplified depiction.

FIG. 1 shows a resolver 1 in a simplified depiction, which includes an exciter winding 2 as well as a first receiver winding 3 and a second receiver winding 4. The receiver windings 3 and 4 are disposed in a housing so as to be offset to one another by 90° while encompassing a rotor. The rotor is rotatably mounted and can carry the exciter winding 2. The exciter winding 2 can then be electrically contacted, for example, by means of slip rings and brushes. Alternatively, a brushless design of the resolver 1 is also conceivable. Provision is particularly made in the present embodiment for the exciter winding 2 to be associated with the rotor by being fixedly disposed relative to the stator or, respectively, the housing. In this way, said exciter winding can inductively couple a magnetic field into the rotor.

The rotor is, for example, connected in a rotationally fixed manner to an output shaft of an electrical machine; thus enabling the angular position of the rotor to correspond to the angular position of the output shaft of the electrical machine. It is also conceivable that the exciter winding 2 is directly disposed on the output shaft of the electrical machine, so that the output shaft forms the rotor.

During operation, the exciter winding is excited by an AC voltage which generates a magnetic field in the rotor, which is detected by the receiver windings 3, 4. The phasing of the voltage induced by the exciter winding, which is detected by the receiver windings 3, 4, depends on the position of the rotor. At an angular position of 0°, the maximum coupling of the magnetic field into the cosine track or, respectively, into the stator winding 4 occurs. At an angular position of 90°, the maximum coupling of the magnetic field into the sine track or, respectively, into the stator winding 4 occurs. At an angular position of 45°, the magnetic field is coupled proportionately into the receiver winding 3 and the receiver winding 4. During a revolution of the rotor including the rotor winding 2, as indicated by arrows in FIG. 1, the resolver thus delivers an AC voltage, the phasing of which rotates or, respectively, changes from 0 to 360°. The phasing of the output voltage of the exciter winding 2 in relation to the regulator voltage is therefore a measurement for the angular position of the rotor or, respectively, the exciter winding 2.

Alternatively, the exciter winding 2 is excited by means of a sinusoidal AC voltage. In this case, the amplitudes of the voltages induced in the receiver windings 3 and 4 are then dependent on the angular position of the rotor or, respectively, the exciter winding 2 and correspond to the sine and the cosine of the angular position of the rotor. The case described last will now be looked at in greater detail. In order to detect the angular position, the voltages generated in the receiver windings 3 and 4 are therefore monitored. If the angular position of the rotor is, however, at 0°, a voltage of 0 volts is then acquired at the receiver winding 3. Hence, a short circuit in the receiver winding 3 cannot be distinguished from an intact resolver 1 when the electrical machine is at rest in this position. Moreover, at a rotor position of 0° to 180°, a short circuit in the windings cannot be distinguished from an intact resolver 1 by means of the sine track or the receiver winding 4.

Figure 2:
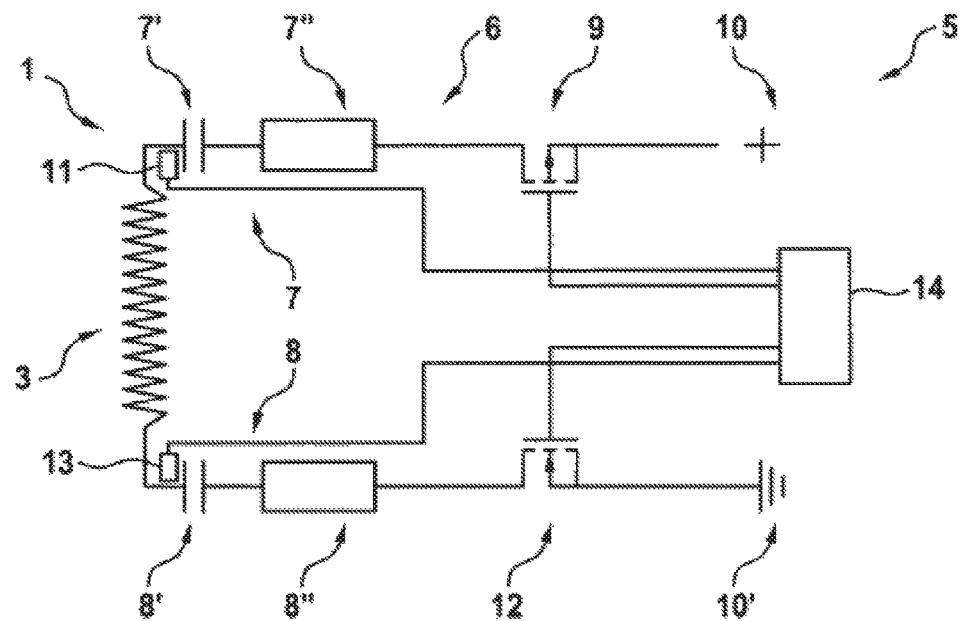
FIG. 2 shows an advantageous resolver device.

FIG. 2 shows an advantageous resolver device 5 which includes the resolver 1, from which only the receiver winding 3 is shown here, as well an apparatus 6 for operating the resolver 1, by means of which a defect in the resolver 1 can be detected in a simple manner even when the rotor is located in the 0° angular position.

To this end, the resolver device 5 has two RC circuits 7, 8 which are each connected to an end of the receiver winding 3. The RC circuits have in each case a capacitor 7' or 8' and a resistor 7" or 8" connected in series, wherein the capacitors 7', 8' are each connected between the resistors 7", 8" and the receiver winding 3.

The first RC circuit 7 can be connected to a positive voltage source 10 by means of an actuable switch 9, which is designed as a transistor in the present embodiment. In so doing, a voltage detection device 11 is associated with the switch 9, by means of which device the voltage passed through the switch 9 can be detected.

The second RC circuit 8 is or can be accordingly connected to a negative voltage source 10', in the present embodiment to ground, by means of a second switch 12, which is likewise designed as a transistor. A voltage detection device 13 is likewise associated with the second switch 12, by means of which device the voltage passed through the switch 12 can be detected. The detected voltages are evaluated by means of a control device 14, which also actuates the switches 9 and 12.

Figure 3:
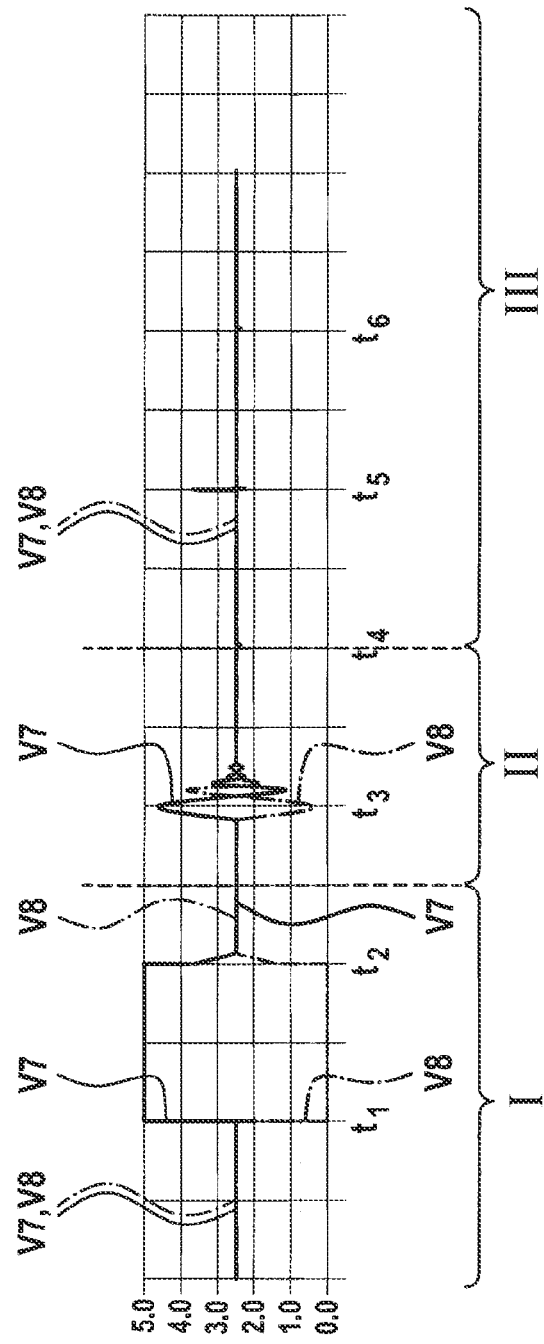
FIG. 3 shows an oscillation behavior of a receiver winding of the resolver device.

With the aid of the diagram depicted in FIG. 3, the functionality of the resolver device 5 or, respectively, the apparatus 6 is explained in detail. In order to perform a functionality test, the control unit 14 simultaneously actuates the two switches 9 and 12 a number of times, so that the transistors are simultaneously deactivated or are simultaneously conductive.

In FIG. 3, the voltages V7 and V8 acquired by the voltage detection devices 11, 13 are plotted versus time t for three different cases. For that reason, the diagram is divided up into three sections I, II and III. The transistors or, respectively, switches 9, 12 are each simultaneously activated at the points in time $t_1$, $t_3$ and $t_5$ and deactivated at the points in time $t_2$, $t_4$ and $t_6$.

In the middle section II, the oscillation behavior of the receiver winding 3 generated by the RC circuit 7 and 8 is depicted for the normal case. If the resolver 1 is operating correctly, a decaying oscillation behavior of the voltages V7 and V8 can then be seen starting at the point in time $t_3$, at which the switches are electrically conductive, up to a point in time $t_4$, at which the switches 9, 12 once again are deactivated. In this case, the self-inductance of the receiver winding 3 oscillates with the capacitive load of the phase that has been switched on. A difference signal is advantageously formed from the two voltages V7 and V8, which then has a characteristically decaying sinusoidal form, which enables a differentiation of the normal behavior from a short circuit, as is shown in section III, and from an interruption, as is shown in section I.

If an interruption is present in the electrical path, voltage fluctuations, which continue up until the transistors are deactivated or switched off, are detected by the voltage detection devices 11, 13 upon actuating the switches 9, 12.

If a short circuit is present, by means of which the receiver winding 3 is bypassed, the behavior depicted in section III then results. If the transistors are switched on and become conductive at a point in time $t_5$, the detected voltage signals V7 and V8 correspond to one another. There are dynamic deviations only at the point in time of switching, which, however, occur as a result of the switching action itself and only for a short time, as is shown in FIG. 3.

Corresponding to the voltage profiles depicted, respectively one corresponding difference signal results which is preferably used to evaluate the detected voltage in a simple and easy manner. If the control unit 14 consequently detects that the signal profile of the reference signal or of the voltage detection device 11, 13 does not change or hardly changes from the point in time of switching on the switches 9, 12 to the point in time of switching off said switches 9, 12, a short circuit is then detected (case III). If it is detected that the voltages V7 and V8 assume constant values and are different from one another during the time in which the transistors are conductive, an interruption in the electrical of the receiver winding 3 is then detected (case I). Only then if a decaying oscillation behavior of the detected voltages or of the difference signal is detected, does the control unit recognize a correct functioning of the resolver 1 (case II).

A winding short circuit would result in a massive reduction in the self-inductance and the oscillation duration and could therefore likewise be diagnosed and detected by the aforementioned apparatus 6 as well as by the method described above. A corresponding apparatus 6 is also associated with the second receiver winding 4, wherein the check of the second receiver winding 4 is preferably performed temporally offset to the check of the receiver winding 3 in order to prevent interactions. During the check, it is recommended to switch the exciter winding to "tristate" or to short circuit the same because, at angular positions in which a magnetic coupling between exciter winding and receiver winding exists (i.e. in the sine track at all angles except 0° and 180°, the short circuit of the exciter winding would more or less be transformed onto the receiver winding, and the measurement result would falsely correspond to the point in time $t_5$. This would therefore be a misdiagnosis.

The invention claimed is:

1. An apparatus for operating a resolver, the apparatus comprising:
   at least one receiver winding and an exciter winding which are associated with a rotor, and
   an evaluation device which determines an angular position of the rotor as a function of an induced voltage that is generated by the exciter winding and detected by the receiver winding,
   wherein the receiver winding is connected at a first end to a first actuable switch by a first RC circuit including a first resistor in series with a first capacitor, the first actuable switch connecting the first RC circuit as required to a positive voltage source, and
   wherein the receiver winding is connected at a second end to a second actuable switch by a second RC circuit including a second resistor in series with a second capacitor, the second actuable switch connecting the second RC circuit as required to a negative voltage source, and to a control unit which simultaneously actuates the first and second actuable switches as required and thereby monitors the oscillation behavior of the receiver winding in order to detect a defect in the resolver.

2. The apparatus according to claim 1, wherein the first and second actuable switches are transistors.

3. A resolver device comprising:
   a resolver which has at least two receiver windings and at least one exciter winding, which is associated with a rotor, and
   an evaluation device which determines an angular position of the rotor as a function of a voltage induced by the rotor winding and a first receiver winding of the at least two receiver windings, wherein the first receiver winding of the at least two receiver windings is connected at a first end to a first actuable switch by a first RC circuit including a first resistor in series with a first capacitor, said first actuable switch connecting the first RC circuit as required to a positive voltage source, and wherein the first receiver winding is connected at a second end to a second actuable switch by a second RC circuit including a second resistor in series with a second capacitor, said second actuable switch connecting the second RC circuit as required to a negative voltage source, and to a control unit which simultaneously actuates the first and second actuable switches as required and thereby monitors the oscillation behavior of the first receiver winding in order to detect a defect in the resolver.

4. The resolver device according to claim 3, wherein a second receiver winding of the at least two receiver windings is connected at a first end of the second receiver winding of the at least two receiver windings to a third actuable switch by a third RC circuit including a third resistor in series with a third capacitor, said third actuable switch connecting the third RC circuit as required to a second positive voltage source, and wherein the second receiver winding of the at least two receiver windings is connected at a second end of the second receiver winding of the at least two receiver windings to a fourth actuable switch by a fourth RC circuit including a fourth resistor in series with a fourth capacitor, the fourth actuable switch connecting the fourth RC circuit as required to a second negative voltage source, and to the control unit which simultaneously actuates the third and fourth actuable switches as required and thereby monitors the oscillation behavior of the second receiver winding of the at least two receiver windings in order to detect a defect in the resolver.

5. A method for operating a resolver device, the method comprising:
    connecting a first receiver winding at a first end to a first actuable switch by a first RC circuit including a first resistor in series with a first capacitor, said first actuable switch connecting the first RC circuit as required to a positive voltage source, and
    connecting the first receiver winding at a second end to a second actuable switch by a second RC circuit including a second resistor in series with a second capacitor, said second actuable switch connecting the second RC circuit as required to a negative voltage source,
    simultaneously actuating, with a control unit, the first and second actuable switches;
    monitoring, with the control unit, the resulting oscillation behavior of the first receiver winding; and
    suggesting a defect, with the control unit, in the resolver as a function of the oscillation behavior.

6. The method according to claim 5, further comprising acquiring a first voltage profile at a first point between the first end and the first actuable switch and a second voltage profile at a second point between the second end and the second actuable switch in order to monitor the oscillation behavior.

7. The method according to claim 6, wherein a short circuit is suggested if the first voltage profile and the second voltage profile correspond at least substantially to one another.

8. The method according to claim 6, wherein an interruption is suggested if the first voltage profile and the second voltage profile are different from one another at least substantially in an oscillation-free manner.

9. The method according to claim 5, wherein a faultless operation is recognized if a decaying oscillation behavior is detected.

* * * * *